No. 768,551. Patented August 23, 1904.

UNITED STATES PATENT OFFICE.

JOSÉ BAXERES DE ALZÚGARAY, OF BROMLEY, ENGLAND.

MANUFACTURE OF IRON AND STEEL AND THEIR ALLOYS.

SPECIFICATION forming part of Letters Patent No. 768,551, dated August 23, 1904.

Application filed June 16, 1903. Serial No. 161,678. (No specimens.)

*To all whom it may concern:*

Be it known that I, JOSÉ BAXERES DE ALZUGARAY, a citizen of Argentina, and a resident of Lola Villa, Bromley, in the county of Kent, England, have invented certain new and useful Improvements in the Manufacture of Iron and Steel and Their Alloys, of which the following is a specification.

This invention relates to the production of iron and steel and their alloys direct from the ore, the object of the invention being to simplify the treatment of the ores of a more or less general character and to provide an effective method of treating those ores which contain more or less large quantities of phosphorus, sulfur, and other injurious elements.

To this end the invention consists, broadly, in adding to the ore fluxing and refining agents with or without reducing or carbonaceous material.

For the purpose of this invention the ore and the materials to be mixed with it are first pulverized and are then made into bricks or slabs for convenience of subsequent treatment. If the ore is of a magnetic character, the pulverized ore may be concentrated by magnetic concentration or by any other suitable process.

I am aware that it has been proposed to mix pulverized ore with pulverized reducing or carbonaceous material and a fluxing material and to make the same into bricks or slabs for convenience of treatment, and I do not, therefore, make any claim for such mixture nor for the making into bricks.

The methods of procedure just referred to are not successful, especially with what may be termed "refractory" ore, such as above referred to; but by adding to the pulverized ore a refining agent, in addition to the other materials mentioned, I have obtained extraordinary results even with a refractory ore.

In carrying out this invention I may proceed in one of two ways. Thus I may mix the carbonaceous material with the ore, the fluxing, and the refining material and make it into blocks or slabs, to which I give the name of "carburized" bricks, or I may leave out the carbonaceous material, in which case I designate the bricks as "non-carburized" bricks. In the first case, the reducing agent being mixed with the ore in suitable proportion, the addition of carbonaceous material in the fusing operation will be unnecessary, while in the second case the carbonaceous material will be added in the blast-furnace in the usual way. In the latter case the reducing material employed may be gas, as now well understood. The production of the carburized or non-carburized bricks will to some extent be determined by the question of transport or the use to which they are to be subsequently applied. Thus in the first case the bricks may be employed in the making of steel for the purpose of recarburizing in the Bessemer furnace, while in the second case the bricks will be used in order to decarburize in the Siemens, the open-hearth, or the tilting furnace. The two kinds of bricks may also be used together or consecutively in the furnace, in which case they will constitute a new process for producing steel, although the property of the non-carburized bricks will be to decarburize the excess of carbon in the carburized bricks.

For the purpose of illustrating this new process I may give the following formula, it being understood that the proportions and the materials referred to for each kind of brick may be varied according to circumstances, thus:

| *Carburized Bricks.* | *Non-carburized Bricks.* |
|---|---|
| Ore ............... 65 parts. | Ore ............... 65 parts |
| Coke .............. 25 parts. | Fluor-spar ........ 5 parts. |
| Fluor-spar ........ 5 parts. | + Sodium chlor..... 2½ parts. |
| Sodium chlor...... 2½ parts. | Silicate or slag.... 25 parts. |
| Lime .............. 2½ parts. | Lime .............. 2½ parts. |
| 100 parts. | 100 parts. |

=steel.

In the above-named constitution of the bricks the silicate or slag will act the part of a binder, while the fluor-spar and the chlorid serve as flux and purifying or refining agent respectively. Other materials which will be suitable for the latter purpose are earthy or alkali oxids, other chlorids, fluorids, nitrates, silicates, or mixtures of these several bodies or compounds.

By mixing and treating the ore as above described the elimination of phosphorus, sulfur, and other injurious elements is effected.

The preparation of the bricks may be as follows: The pulverized materials are well mixed together dry, and the mixture is then moistened with about ten per cent. or other suitable proportion of the quantity of the ore, of lime, and water (or it may be sea-water) and the whole is well kneaded. The mass is then subjected to sufficient pressure in a suitable apparatus as to form bricks or slabs of great consistency. The bricks or slabs are afterward dried for a few days by exposure to the air under cover and finally in a suitable oven or kiln.

As the result of my experiments and tests I have found that the treatment of the bricks carburized and non-carburized separately, as above set forth, produces a very high quality of pig-iron, which I designate "refined" pig-iron, and obviously this material may be used for any purposes other than those above named for which it is suitable.

In manufacturing iron and steel alloys according to this invention—such, for instance, as the several kinds of spiegel, ferromanganese, silicospiegel, ferrosilicon, ferroaluminium, ferrochromium, and ferronickel—and also the steel of various grades and its alloys with manganese, chromium, tungsten, nickel, copper, titanium, aluminium, silicon, boron, molybdenum, vanadium, and other metals or metallic mixtures the bricks of either character before mentioned, according to the alloy to be obtained, are mixed with oxids, the reduced metals, or any salt of the metal or metals or non-metallic elements to be alloyed.

What I claim as my invention is—

In the process of manufacturing iron and steel and their alloys, producing refined pig-iron by mixing pulverized ore with pulverized carbon in excess of that required for reduction and an alkaline substance and water, adding thereto a mixture of a fluorid and a chlorid, forming fluxing and refining agents, compressing the mixture into bricks and subjecting the bricks to the action of heat in any well-known manner as described.

In testimony whereof I have signed my name to this specification in the presence of two subscribing witnesses.

JOSÉ BAXERES DE ALZUGARAY.

Witnesses:
A. S. BISHOP,
A. COSTA.